United States Patent [19]

Burnham

[11] Patent Number: 5,084,721
[45] Date of Patent: Jan. 28, 1992

[54] FOLDING DUAL LENS CAMERA

[75] Inventor: William L. Burnham, Leroy, N.Y.

[73] Assignee: Eastman Kodak Company, Rochester, N.Y.

[21] Appl. No.: 670,117

[22] Filed: Mar. 15, 1991

[51] Int. Cl.⁵ .............................................. G03B 17/04
[52] U.S. Cl. ................................ 354/187; 354/195.12; 354/288
[58] Field of Search .......................... 354/187–194, 354/195.12, 288

[56] References Cited

U.S. PATENT DOCUMENTS

| | | | |
|---|---|---|---|
| 2,759,405 | 8/1956 | Härter | 354/191 |
| 3,185,061 | 5/1965 | Westphalen | 354/195.12 |
| 4,132,471 | 1/1979 | Svatek et al. | 354/187 |
| 4,557,571 | 12/1985 | Reibl | 354/149.11 |
| 4,688,913 | 8/1987 | Whiteside et al. | 354/187 |
| 4,723,140 | 2/1988 | Whiteside et al. | 354/187 |
| 4,983,999 | 1/1991 | Meisezahl et al. | 354/149.11 |

Primary Examiner—L. T. Hix
Assistant Examiner—David M. Gray
Attorney, Agent, or Firm—Roger A. Fields

[57] ABSTRACT

A photographic camera includes a lens carrier with alternative taking lenses having shorter and longer focal lengths. The lens carrier is pivotable relative to the camera body between a storage position in which the two lenses are concealed within the camera body and respective use positions in which the two lenses alternatively are located for picture-taking.

14 Claims, 6 Drawing Sheets

FOLDING DUAL LENS CAMERA

CROSS-REFERENCE TO RELATED APPLICATIONS

Reference is made to commonly assigned copending application Ser. No. 07/670,116 entitled FOLDING CAMERA WITH LENS COVER, and filed Mar. 15, 1991 in the names of D. J. Glogan, W. L. Burnham and W. J. Meisenzahl, and Ser. No. 07/478,909, now U.S. Pat. No. 4,983,999 entitled CAMERA WITH FLIP-UP FLASH UNIT, and filed Feb. 12, 1990 in the names of D. J. Glogan, W. L. Burnham and W. J. Meisenzahl.

BACKGROUND OF THE INVENTION

1. Field of the Invention

The invention relates generally to the field of photography, and in particular to compact folding cameras.

1. Description of the Prior Art

The classical folding camera is one in which a lens carrier for an objective or taking lens is translatable along the len's optical axis between a folded storage position retracted into the camera body and a non-folded picture-taking position extended from the camera body. Typically, a lens cover is pivotally connected to the camera body for swinging movement between a covering position in front of the objective lens, when the lens carrier is in its folded position, and a non-covering position removed from the objective lens, when the lens carrier is in its non-folded position. See commonly assigned U.S. Pat. No. 2,759,405, issued Aug. 21, 1956, and U.S. Pat. No. 4,557,571, issued Dec. 10, 1985.

Other folding cameras, without a lens cover, include ones in which the lens carrier is supported for swinging movement between a folded storage position retracted into the camera body and a non-folded picture-taking position extended from the camera body. See U.S. Pat. No. 4,132,471, issued Jan. 2, 1979, U.S. Pat. No. 4,688,913, issued Aug. 25, 1987, and U.S. Pat. No. 4,723,140, issued Feb. 2, 1988.

In each of these prior art examples, the folding camera is intended to be used with a lens carrier having only one objective lens.

THE CROSS-REFERENCED APPLICATIONS

Cross-referenced application Ser. No. 07/670,116 discloses a folding camera with a lens cover. The folding camera comprises a camera body, a lens carrier and a lens cover. The lens carrier is supported for swinging movement about a pivot axis between a folded storage position retracted completely into the camera body and a non-folded picture-taking position extended part way from the camera body. The lens cover is supported for swinging movement about the same axis as the lens carrier between a covering position over the lens carrier and a non-covering position removed from the lens carrier. A latch secures the lens cover in its covering position to, in turn, secure the lens carrier in its folded position.

Cross-referenced application Ser. No. 07/478,909, now U.S. Pat. No. 4,983,999 discloses a compact camera with a flip-up flash unit. The flip-up flash unit includes a head part having a flash emission window, a supporting part integrally formed with the head part, and a separate rear supporting part. Each of the supporting parts is pivotally connected to the camera body to permit swinging movement of the flash unit to a folded storage position and to a non-folded operative position. In the folded positions the head part and the supporting parts cover respective portions of the camera body. Conversely, in the non-folded position, the head part and the supporting parts are elevated from the camera body with the flash emission window substantially facing a subject to be photographed and with the supporting part for the head part located in front of the other supporting part and rigidly braced by the latter part. Respective viewfinder openings are arranged in the two supporting parts to be optically aligned when the flash unit is in its non-folded position. The supporting part that is located behind the other one when the flash unit is in its non-folded position is resiliently flexible and is pivotally connected to the other one to be constrained to operate as an overcenter spring to urge the flash unit alternatively to its non-folded and folded positions.

SUMMARY OF THE INVENTION

As compared to the prior art cameras described above, the invention advantageously provides a folding dual lens camera.

According to the invention, a photographic camera includes a lens carrier with alternative taking lenses having shorter and longer focal lengths. The lens carrier is pivotable relative to the camera body between a storage position in which the two lenses are concealed within the camera body and respective use positions in which the two lenses alternatively are located for picture-taking.

DETAILED DESCRIPTION OF THE PREFERRED EMBODIMENT

The invention is described as being embodied in a compact folding 35mm camera. Because such photographic cameras have become well known as typified by the prior art discussed above, this description is directed in particular to camera elements forming part of or cooperating directly with the preferred embodiment. It is to be understood, however, that camera elements not specifically shown or described may take various forms known to persons of ordinary skill in the art.

Referring now to the drawings, FIGS. 1-6 show a compact folding 35mm camera 1 comprising a camera body or housing 3, a unitary lens carrier 5, and a flip-up electronic flash unit 7.

FLASH UNIT 7

The flash unit 7 includes a plastic head part 9 having a flash emission window 11 and a pair of plastic front and rear supporting parts 13 and 15 for the head part. The front supporting part 13 is integrally formed with the head part 9, and is pivotally connected to the camera body 3 by means of an axial pin 17 extending through an axial opening (not shown) in the front supporting part and having protruding opposite ends suspended by the camera body. The pivotal connection of the front supporting part 13 to the camera body 3 permits the flash unit 7 to be manually swung between a folded position, shown in FIGS. 1 and 2, in which the head part 9 fits within a lower recess 19 in the camera body and the front supporting part fits within a front recess 21 in the camera body to cover the lens carrier 5, and a non-folded operative position, shown in FIGS. 314 6, in which the head part and the front supporting part are elevated from the camera body with the flash emission window 11 substantially facing a subject to be photographed. The rear supporting part 15 is pivotally connected to the camera body 3 by means of an axial pin 23 extending through an axial opening (not shown) in the rear supporting part and having protruding opposite ends suspended by the camera body. The pivotal connection of the rear supporting part 15 to the camera body 3 permits that part to be located within a top recess 25 in the camera body when the flash unit 7 is in its folded position, shown in FIGS. 1 and 2, and to be elevated above the camera body when the flash unit is in its non-folded position, shown in FIGS. 2-6. The rear supporting part 15 is resiliently flexible, and it is pivotally connected to the front supporting part 13 via a plastic "living" hinge 27 or other known pivot connection means. This allows the rear supporting part 15 to be constrained to operate as an overcenter spring to urge the flash unit 7 to its non-folded position and to its folded position. See FIGS. 1-4. When the flash unit 7 is in its non-folded position, the rear supporting part 15 braces the flash unit in that position. See FIGS. 3 and 4.

The front supporting part 13 has a rectangular front viewfinder opening 29, and the rear supporting part 15 has a rectangular rear viewfinder opening 31. The rear viewfinder opening 31 is smaller than the front viewfinder opening 29 and is located behind the front opening in alignment with that opening when the flash unit 7 is in its non-folded position to permit a subject to be photographed to be viewed through the two openings along a viewing axis V. See FIGS. 3 and 4. The rear supporting part 15 is bowed to arch rearwardly of the camera body 3 when the flash unit 7 is in its non-folded position to locate the rear viewfinder opening 31 sufficiently removed from the camera body to permit a photographer to place one eye at the rear opening without any interference (obstruction) by the camera body. See FIG. 4. Conversely, when the flash unit 7 is in its folded position, the rear supporting part 15 covers the front viewfinder opening 29. See FIGS. 1 and 2.

Figure 1:
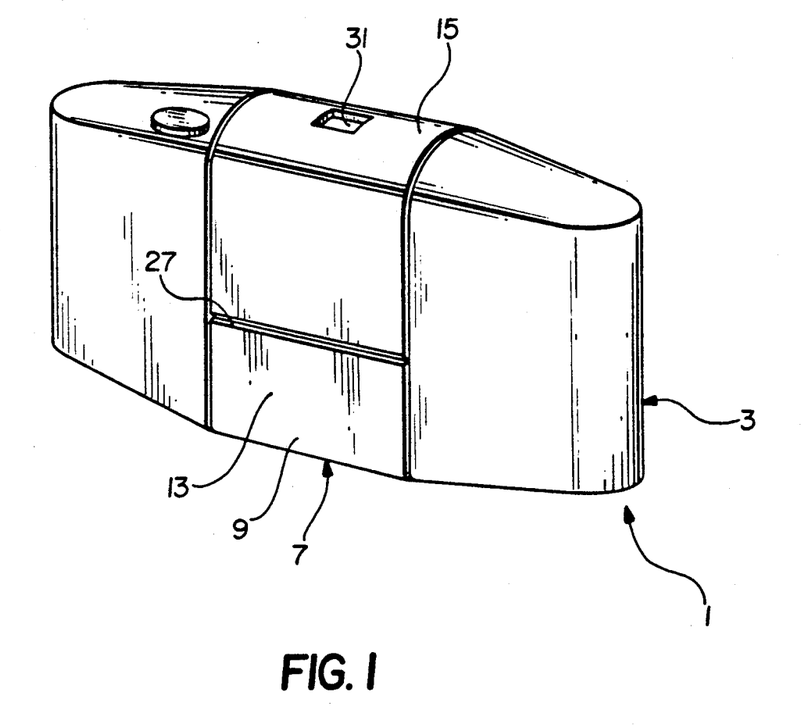
FIG. 1 is a front perspective view of a folding dual lens camera in accordance with a preferred embodiment of the invention, showing the camera when its lens carrier is in a storage position.
Figure 2:
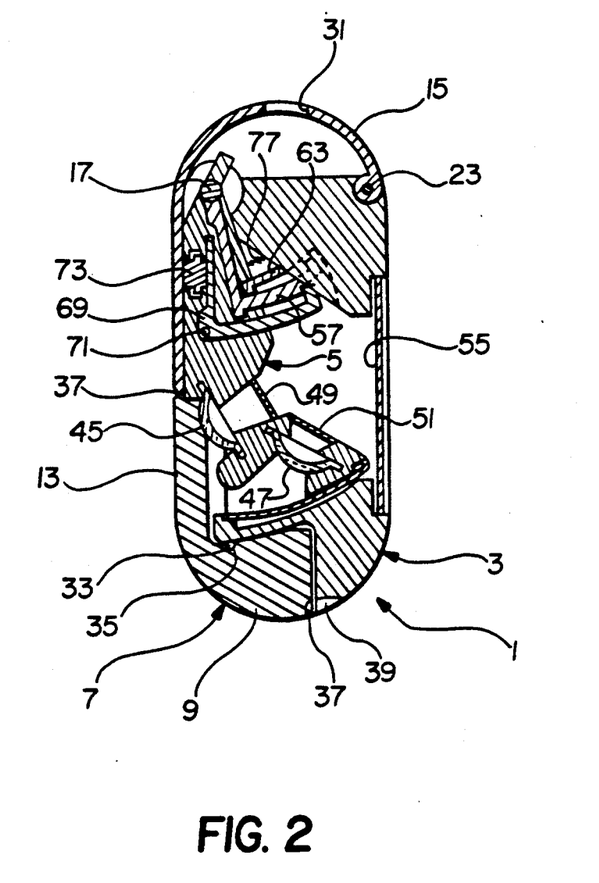
FIG. 2 is a side elevation view of the camera in cross-section, showing the lens carrier in the same position as in FIG. 1.
Figure 3:
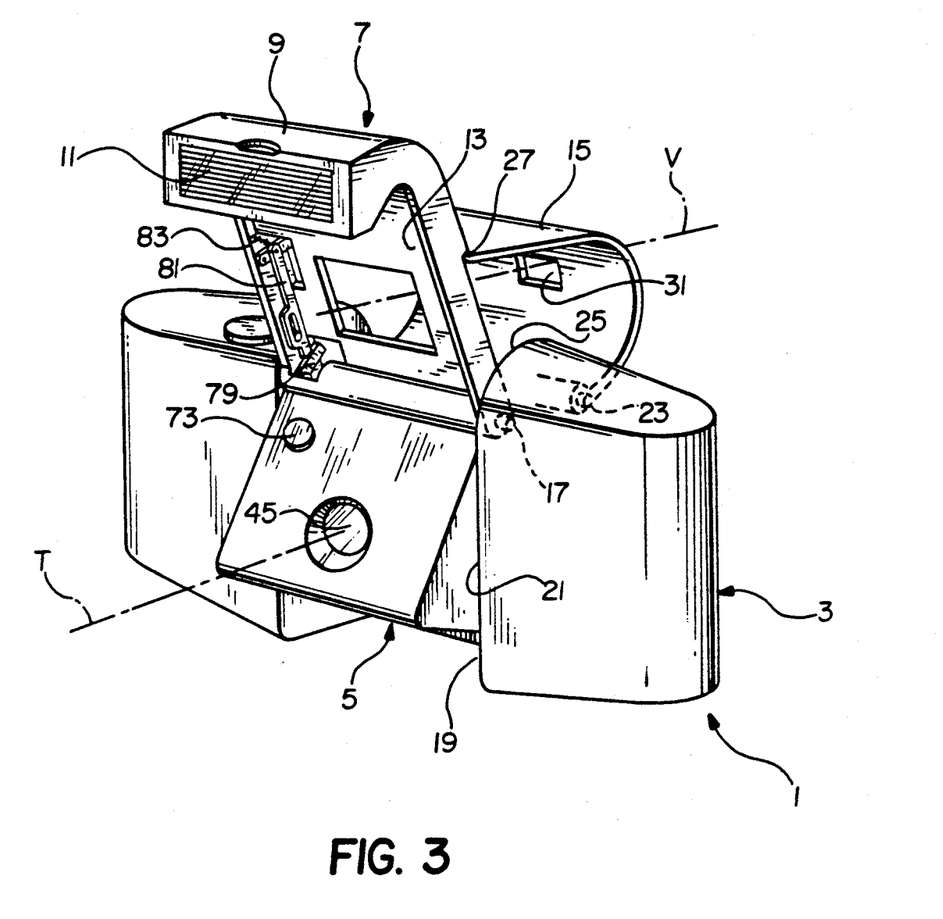
FIG. 3 is a front perspective view similar to FIG. 1, showing the camera when the lens carrier is in one of two alternative use positions.
Figure 4:
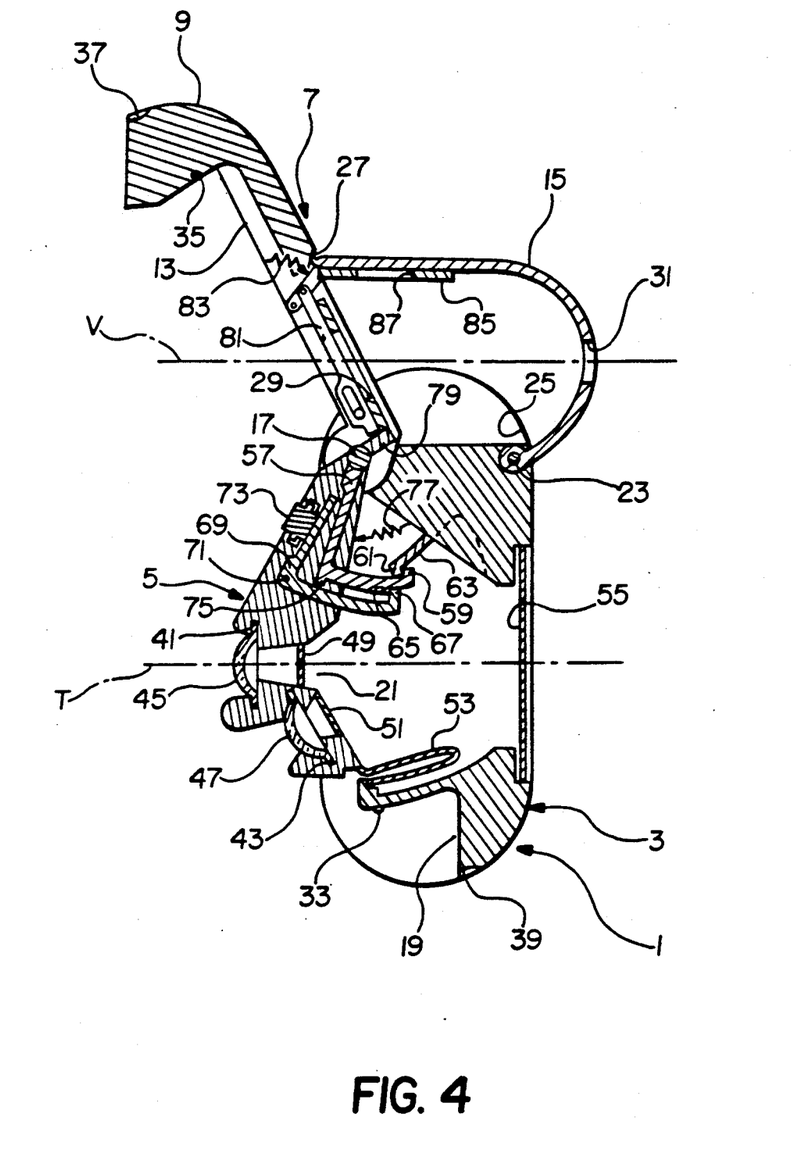
FIG. 4 is a side elevation view of the camera in cross-section, showing the lens carrier in the same position as in FIG. 3.

To use the flash unit 7, the flash unit must be manually swung from its folded position, shown in FIGS. 1 and 2, towards its non-folded position, shown in FIGS. 3 and 4. A small bump 33 projecting from the camera body 3 normally is received in a corresponding recess 35 in the head part 9 to releaseably hold the flash unit 7 in its folded position. Adjacent cut-outs 37 and 39 are provided in the head part 9 and the camera body 3 to permit one to move the head part to dislodge the recess 35 from the bump 33. As the flash unit 7 is manually swung towards its non-folded position, the front supporting part 13 pushes against the rear supporting part 15 at the hinge 27 to swing the latter part out of the top recess 25. See FIGS. 3 and 4. When the rear supporting part 15 is pushed beyond an overcenter position (not shown) of that part, the rear supporting part springs or snaps backward pulling the front supporting part 13 with it to automatically urge the flash unit 7 to its non-folded position.

After picture-taking is completed, the flash unit 7 is manually swung from its non-folded position towards its folded position. As the flash unit 7 is manually swung towards its folded position, the front supporting part 13 pulls the rear supporting part 15 at the hinge 27 to the overcenter position. When the rear supporting part 15 is pulled beyond its overcenter position, the rear supporting part springs or snaps forward pushing the front supporting part 13 to automatically urge the flash unit 7 to its non-folded position.

LENS CARRIER 5

The lens carrier 5 has respective lens mounts 41 and 43 for a shorter focal length lens 45 and a longer focal length lens 47. See FIG. 4. The shorter focal length lens 45 may be a normal lens or a wide-angle lens, and the longer focal length lens preferably is a telephoto lens. Respective known shutters 49 and 51 are secured to the lens carrier 5 inward of the shorter and longer focal length lens 45 and 47. A light-seal rubber bellows 53 extends between the lens carrier 5 and the camera body 3.

Like the flash unit 7, the lens carrier 5 is pivotally connected to the camera body 3 by means of the axial pin 17. The axial pin 17 extends through an axial opening (not shown) in the lens carrier to support the lens carrier for movement between a storage position, shown in FIGS. 1 and 2, in which the shorter and longer focal lengths lens 45 and 47 are removed from a taking axis T through a known pressure plate 55 that defines a film exposure plane, and respective shorter and longer focal length use positions, shown in FIGS. 3-4 and 5-6, in which the shorter and longer focal length lenses alternatively are centered on the taking axis.

A first stop lever 57 pivotally mounted on the axial pin 17 has a first lip portion 59 for engaging a corresponding lip portion 61 of a body portion 63 and a second lip portion 65 for engaging a corresponding lip portion 67 of a second stop lever 69 as shown in FIG. 4, to retain the lens carrier 5 in its shorter focal length use position. The second stop lever 69 is pivotally connected to the lens carrier 5 via an axial pin 71 to enable manual depression of a release button 73 to swing the second stop lever to separate its lip portion 67 from engagement with the second lip portion 65 of the first stop lever 57. A third lip portion 75 of the first stop lever 57 is disposed for engagement by the corresponding lip portion 67 of the second stop lever 69 as shown in FIG. 6 to, with engagement of the first lip portion 59 of the first stop lever and the corresponding lip portion 61 of the body portion 63, retain the lens carrier 5 in its longer focal length use position.

When the flash unit 7 is manually pivoted from its folded position shown in FIGS. 1 and 2, to its non-folded position, shown in FIGS. 3 and 4, a compression spring 77 anchored to the camera body 3 pivots the lens carrier 5 from its storage position, shown in FIGS. 1 and 2, to its shorter focal length use position, shown in FIGS. 3 and 4.

Figure 5:
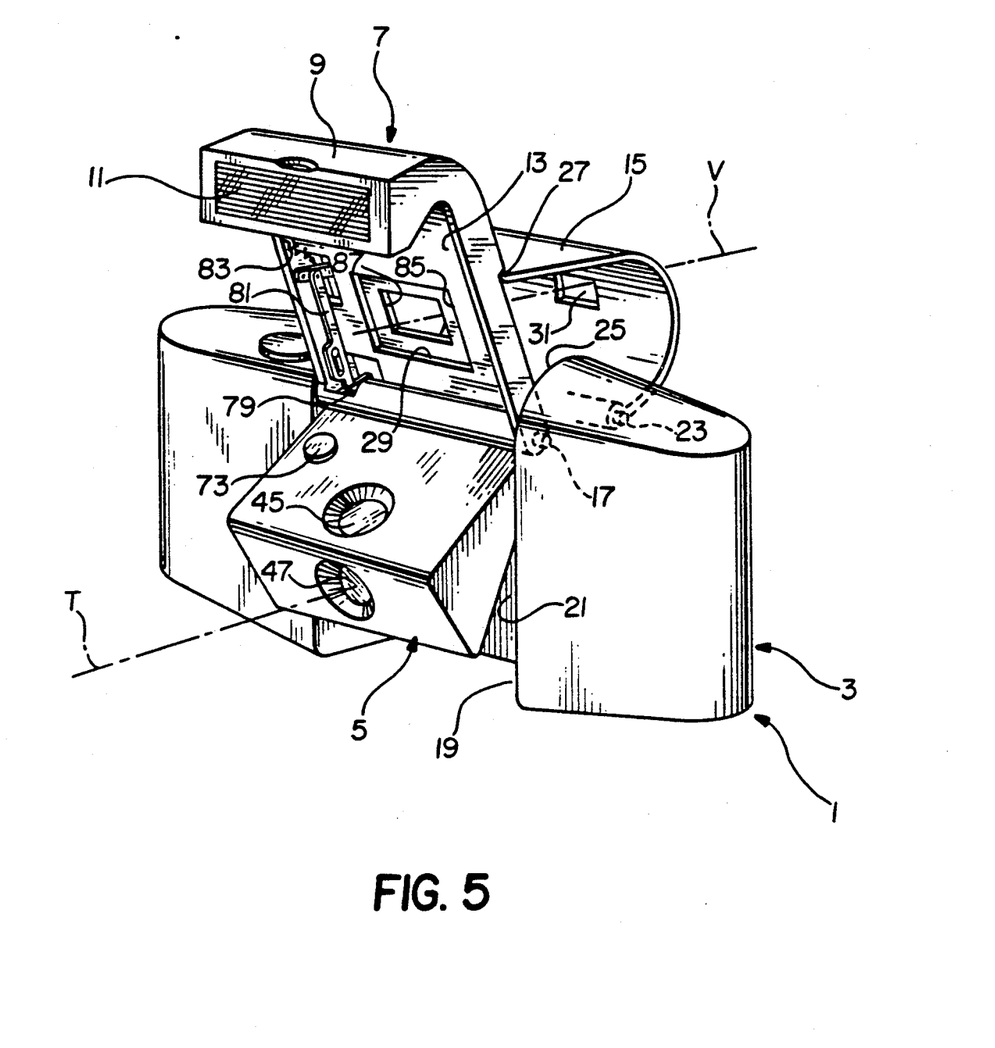
FIG. 5 is a front perspective view similar to FIG. 1, showing the camera when the lens carrier is in the other of its alternative use positions.
Figure 6:
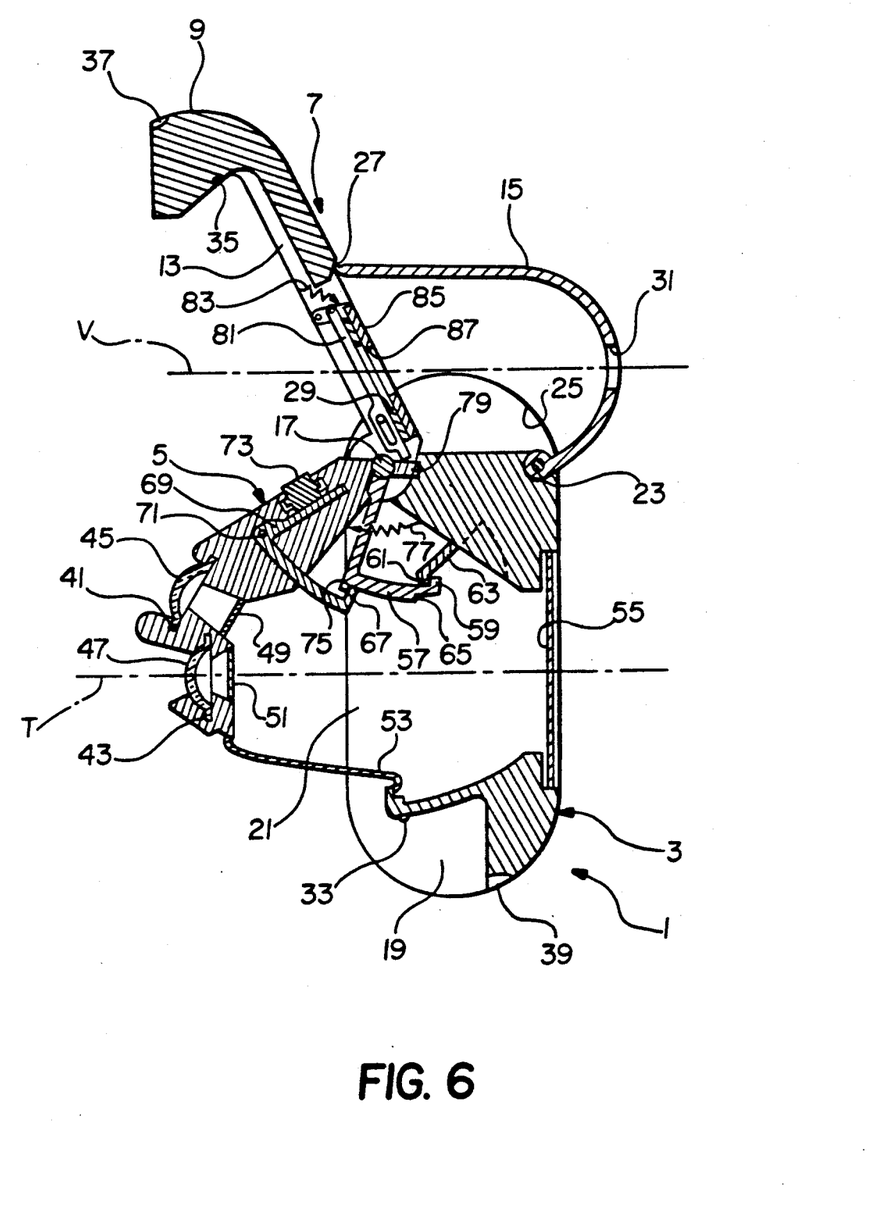
FIG. 6 is a side elevation view of the camera in cross-section, showing the lens carrier in the same position as in FIG. 5.

If as is shown in FIGS. 3 and 4 the flash unit 7 is in its non-folded position, with the lens carrier 5 in its shorter focal length use position, and the release button 73 is manually depressed, the compression spring 77 will pivot the lens carrier to its longer focal length use position, shown in FIGS. 5 and 6. Simultaneously, a blocking portion 79 of the lens carrier 5 will be retracted from a change-over linkage 81 movably mounted on the front supporting part 13 of the flash unit 7 to allow a compression spring 83 anchored to that supporting part to shift the linkage to, in turn, flip a viewfinder mask 85 from a non-use position, shown in FIG. 4, at the underside of the rear supporting part 15 of the flash unit to a masking position, shown in FIGS. 5 and 6, against the front supporting part. In the masking position, a rectangular viewfinder opening 87 of the viewfinder mask 85 overlaps the front viewfinder opening 29 in the front supporting part 13 to permit a subject to be photographed to be viewed through the two openings along the viewing axis V, as well as to be viewed through the rear viewfinder opening 31 in the rear supporting part 15.

The front and rear viewfinder openings 29 and 31 in the front and rear supporting parts 13 and 15 are relatively dimensioned to provide a viewfinder field of view which corresponds to the viewing angle of the shorter focal length lens 45. The remaining viewfinder opening 87 in the viewfinder mask 85 is relatively dimensioned to shrink the viewfinder field of view to the viewing angle of the longer focal length lens 47.

While the invention has been described with reference to a preferred embodiment, it will be understood that various modifications can be effected within the ordinary skill in the art without departing from the scope of the invention.

I claim:

1. A photographic camera comprising a camera body and an objective lens carrier, is characterized in that:
   a pair of alternative picture-taking lenses having respective shorter and longer focal lengths are secured to said lens carrier to permit movement of the lens carrier unitarily with said shorter and longer focal length lenses; and
   support means connects said camera body and said lens carrier for movement of the lens carrier unitarily with said shorter and longer focal length lenses relative to the camera body between a storage position in which neither of said shorter and longer focal length lenses are located to take a picture and respective shorter and longer focal length use positions in which the shorter and longer focal length lenses alternatively are located to take a picture.

2. A photographic camera as recited in claim 1, wherein said lens carrier includes lens mounting means for locating said shorter and longer focal length lenses to conceal them within said camera body when the lens carrier is in its storage position and to reveal them outside the camera body at least alternatively when the lens carrier is in its shorter and longer focal length use positions.

3. A photographic camera as recited in claim 1, wherein said support means includes integral means for retracting said lens carrier unitarily with said shorter and longer focal length lenses at least part way into said camera body when the lens carrier is in its storage position and for extending the lens carrier unitarily with said shorter and longer focal length lenses respective lesser and greater distances from the camera body when the lens carrier is in its shorter and longer focal length use positions.

4. A photographic camera as recited in claim 1, wherein respective shutters are secured to said lens carrier inward of said shorter and longer focal length lenses.

5. A photographic camera as recited in claim 1, wherein said lens carrier is folded unitarily with said shorter and longer focal length lenses at least part way into said camera body when the lens carrier is in its storage position and is unfolded unitarily with said shorter and longer focal length lenses at least part way out of the camera body when the lens carrier is in its shorter and longer focal length use positions.

6. A photographic camera as recited in claim 5, wherein said lens carrier is extended lesser and greater distances from said camera body when the lens carrier is in its shorter and longer focal length use positions.

7. A photographic camera as recited in claim 6, wherein said support means includes integral means for pivoting the lens carrier eccentrically with respect to the camera body as the lens carrier is moved between its storage position and its shorter and longer focal length use positions.

8. A photographic camera as recited in claim 1, wherein said support means includes integral means for moving said lens carrier inwardly and outwardly of said camera body unitarily with said shorter and longer focal length lenses as the lens carrier is moved between its storage position and its shorter and longer focal length use positions.

9. A photographic camera comprising a camera body and an objective lens carrier, is characterized in that:
   a pair of alternative picture-taking lenses having respective shorter and longer focal lengths are secured to said lens carrier to permit movement of the lens carrier unitarily with said shorter and longer focal length lenses; and
   support means connects said camera body and said lens carrier for pivoting the lens carrier unitarily with said shorter and longer focal length lenses relative to the camera body to respective shorter and longer focal length use positions in which the shorter and longer focal length lenses alternatively are located to take a picture.

10. A photographic camera as recited in claim 9, wherein said support means includes integral means connecting said camera body and said lens carrier for pivoting the lens carrier unitarily with said shorter and longer focal length lenses relative to the camera body to a storage position in which neither of said shorter and longer focal length lenses are located to take a picture.

11. A photographic camera as recited in claim 9, wherein said support means includes integral means for moving said lens carrier unitarily with said shorter and longer focal length lenses from inward of said camera body to outward of the camera body as the lens carrier is pivoted from its shorter focal length use position to its longer focal length use position.

12. A photographic camera as recited in claim 11, wherein said integral means includes a pivot pin connecting said lens carrier eccentrically to said camera body.

13. A photographic camera comprising a camera body and a lens carrier, is characterized in that:
- a pair of alternative taking lenses having respective shorter and longer focal lengths are secured to said lens carrier to permit movement of the lens carrier unitarily with said shorter and longer focal length lenses; and
- support means connects said camera body and said lens carrier for movement of the lens carrier unitarily with said shorter and longer focal length lenses inwardly and outwardly of the camera body to respective shorter and longer focal length use positions in which the shorter and longer focal length lenses alternatively are located to take a picture.

14. A photographic camera as recited in claim 13, wherein arresting means for holding said lens carrier in its shorter focal length use position includes manual release means for releasing the lens carrier for movement to its longer focal length use position.

* * * * *